July 4, 1950  L. H. SNYDER  2,513,594
AUTOMATIC BEVERAGE MAKER
Filed Jan. 1, 1945  4 Sheets-Sheet 1
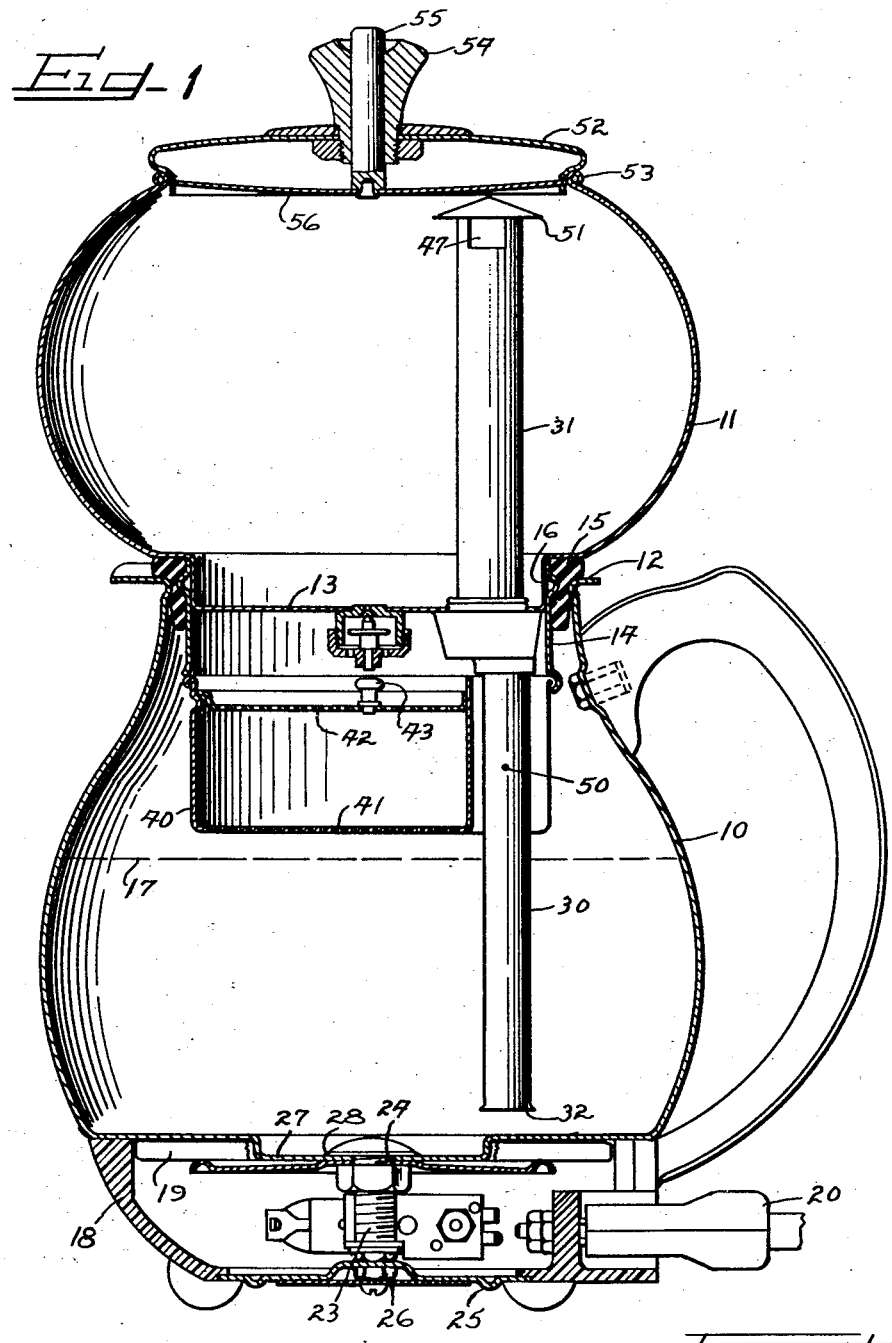
INVENTOR
Leland H. Snyder

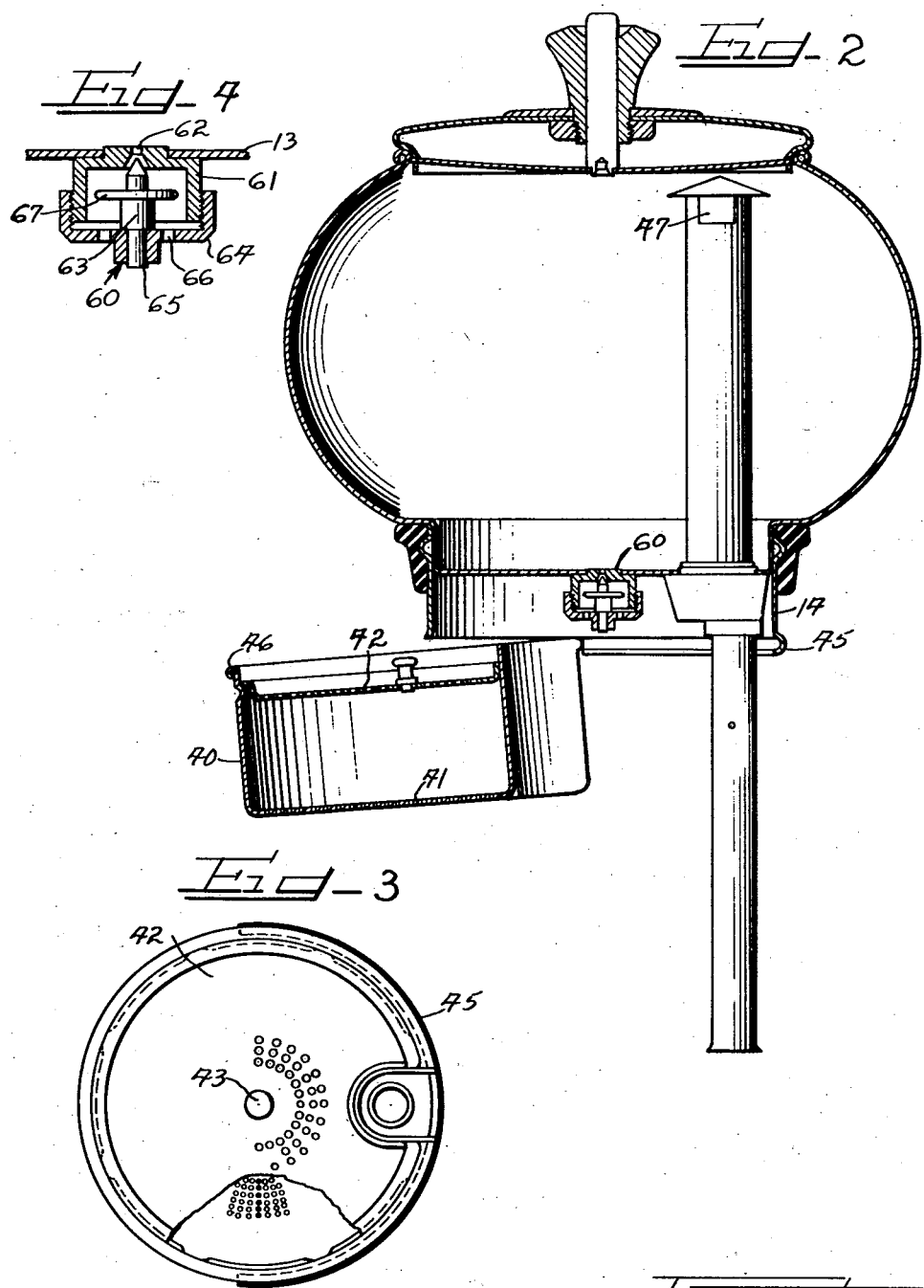

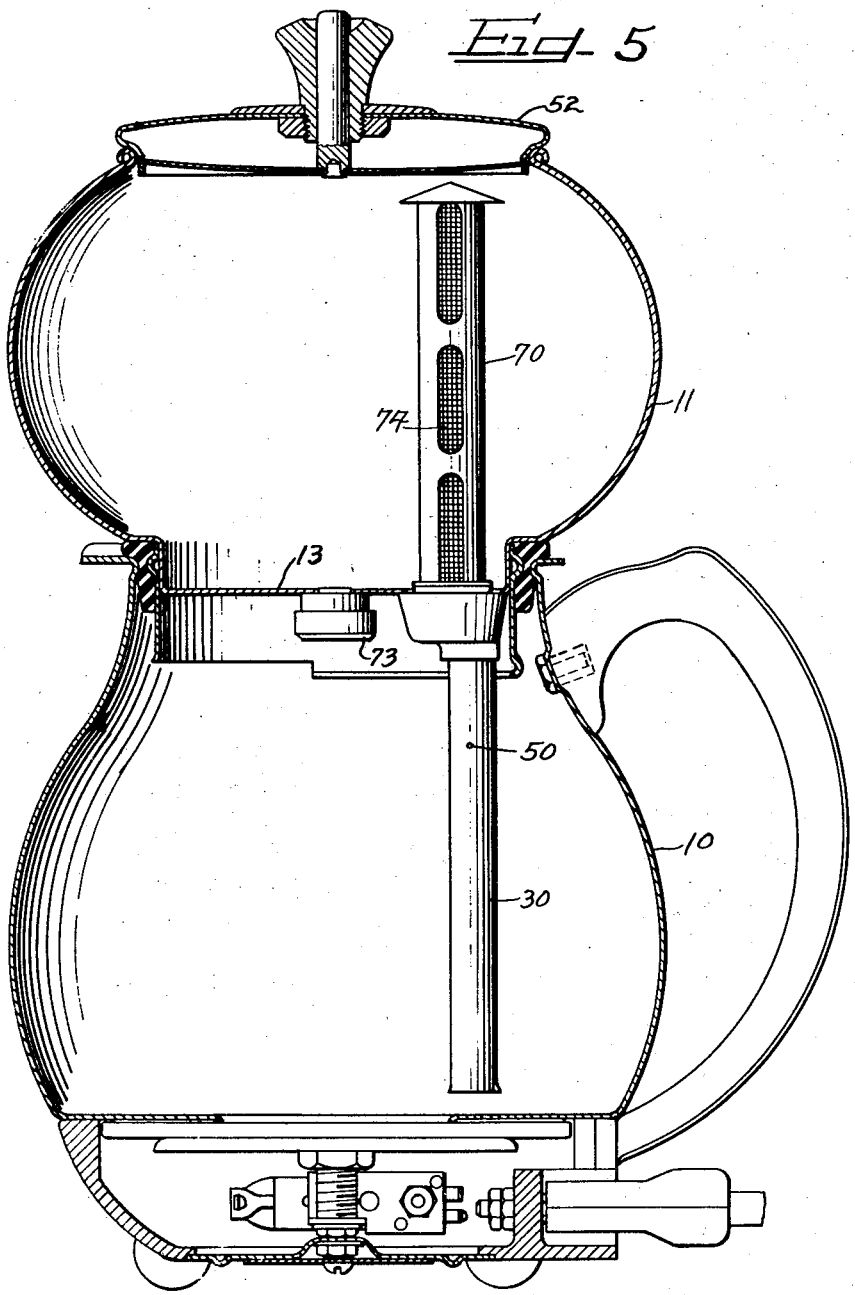

July 4, 1950 L. H. SNYDER 2,513,594
AUTOMATIC BEVERAGE MAKER
Filed Jan. 1, 1945 4 Sheets-Sheet 4
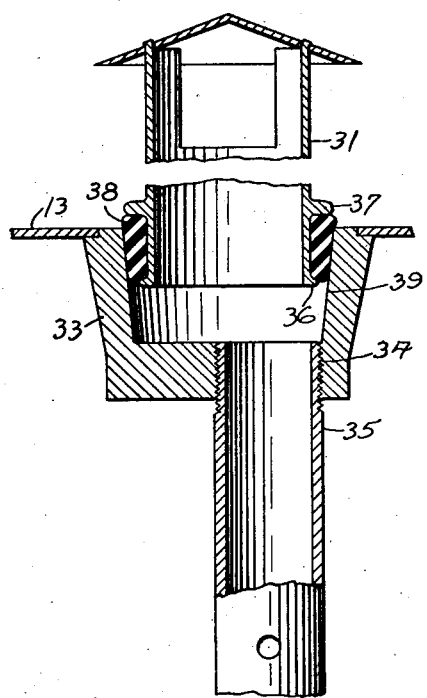
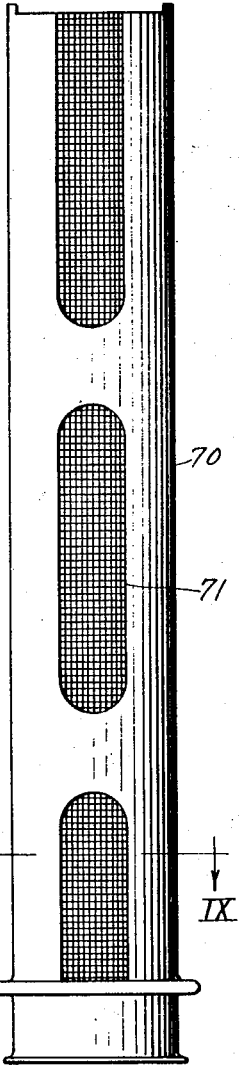
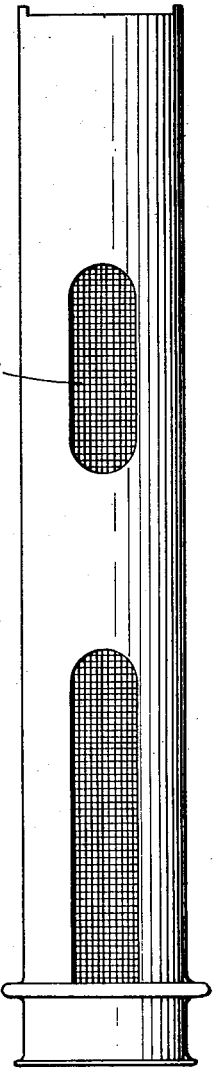
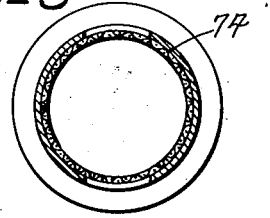
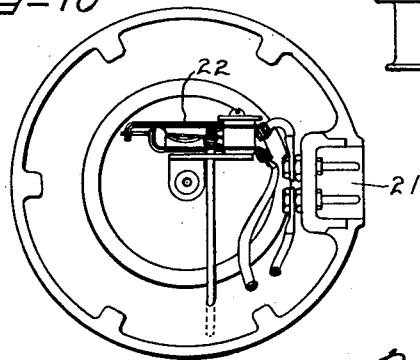
INVENTOR
Leland H. Snyder Patented July 4, 1950

2,513,594

UNITED STATES PATENT OFFICE 2,513,594

AUTOMATIC BEVERAGE MAKER

Leland H. Snyder, Chicago, Ill., assignor, by mesne assignments, to Knapp-Monarch Company, St. Louis, Mo., a corporation of Delaware Application January 1, 1945, Serial No. 570,844

8 Claims. (Cl. 99—292)

My invention relates to an automatic beverage maker, such as a coffee maker, to a device for making a beverage such as coffee according to a first method which includes allowing the heated water to drip over the infusion material such as the ground coffee, or to the making of the beverage by a second method by transferring the heated water from a lower to an upper container where it is brewed with the coffee, the brew being then sucked back to the lower container, the device being adapted to be used in either of the first or the second of its dual methods with only a minimum change of parts.

My invention also relates to an improved method of brewing coffee.

Beverages such as coffee have been made in various ways in the past by infusion in order to obtain a desirable beverage. Thus, one method includes the so-called drip method which is usually carried out with a coffee making apparatus having upper and lower containers and with a perforated coffee basket between the containers. Heated water is poured into the upper container so that it will pass through the coffee in the basket, and the brew will be deposited in the lower container or bowl from which the beverage is dispensed. Another type of coffee maker includes an upper and lower bowl with a tube depending from the upper bowl and extending into the lower bowl. The coffee is placed in the upper bowl, and upon heating the water it will rise into the upper bowl where the coffee is placed, and after the lower bowl has cooled a partial vacuum will be developed in the lower bowl so as to suck the brew into the lower bowl. A coffee maker for making coffee by this method has usually been called a vacuum coffee maker. Of course, coffee may also be made in a variety of other ways, such as by mixing ground coffee and water and heating them to a boiling point.

One of the difficulties of forming a beverage such as coffee by the last mentioned method is that it is difficult to obtain coffee of a consistently good quality as sometimes the coffee becomes boiled which appears to adversely affect its taste. A difficulty of the so-called drip method is that it is usually necessary to mechanically transfer the heated water from a separate vessel to the upper container, and then the water drips through the coffee relatively slowly, so that it takes a relatively long time to produce even a few cups of coffee by this drip method. One of the difficulties of making coffee by the so-called vacuum method as it has been practiced in the past is that the ground coffee is usually dumped into the upper container where the heated water contacts it and then after the lower container has cooled sufficiently to produce the partial vacuum, the brew is sucked into the lower container, thus coffee made by this process takes varied times to be made depending upon how fast the lower container is cooled, and the volatile vapors from the brew may escape through the cover of the upper container so that such volatile vapors are not dissolved in the liquid to be returned to the lower container for the beverage. Thus, when the coffee is made by a method in which the operator can smell the coffee, he is necessarily losing some of the volatile vapors which should be transferred to the liquid rather than to the surrounding air in order to produce a good cup of coffee.

It is therefore an object of my invention to provide an improved automatic beverage maker which will produce consistently a beverage of high quality in a relatively short time.

A further object of my invention is to produce an automatic beverage maker in which the beverage can be made which is of consistently good quality and which is ready to use while at the desired temperature.

A still further object of my invention is to provide an improved automatic coffee maker for making coffee according to the drip principle in an improved manner.

A still further object of my invention is to provide a dual coffee maker which may make coffee according to either one or two methods with a minimum transfer of parts.

A still further object of my invention is to provide an improved method of brewing a beverage such as coffee.

Further objects and advantages of my invention will become apparent from the following description referring to the accompanying drawings, and the features of novelty which characterize my invention will be pointed out with particularity in the claims annexed to and forming a part of this specification.

On the drawings:

Figure 1 is a sectional side elevation of my improved beverage device being adapted to make a beverage by a drip method;

Figure 2 is a sectional side elevation of the upper bowl assembly of the structure of Figure 1 with the ground coffee basket in the process of being assembled with the upper bowl;

Figure 3 is a top view in partial section of the lower wall of the top bowl of Figure 2;

Figure 4 is a sectional side elevation of the pressure-operated valve which is employed in the construction of Figure 2;

Figure 5 is a sectional side elevation of the automatic beverage maker of Figure 1 with certain of the parts being changed so that the device may produce a beverage such as coffee by an automatic vacuum method;

Figure 6 is a partial sectional side elevation of the upper and lower riser tubes and connector tubes of the structure of Figures 1 and 2;

Figure 7 is a side view of the riser tubes employed with the construction of Figure 5 when the coffee is made according to the automatic vacuum method;

Figure 8 is a side view of the riser tube showing the opposite side of the tube than that shown in Figure 7;

Figure 9 is a plan view of the upper riser tube taken along the line IX—IX of Figure 7; and Figure 10 is a bottom view of the base of the lower bowl illustrating the electrical arrangement including the thermostatically operated switch.

In the drawings I have illustrated my invention as applied to an automatic coffee maker, but it will be understood that my invention may be employed to make any other suitable type of beverage which is formed by an infusion method.

Referring to Figure 1 of the drawings, I have illustrated my invention as applied to a coffee maker for producing coffee in an automatic manner in which the heated water drips through the ground coffee so as to produce the brew. The coffee maker includes a first or lower bowl or container 10 and an upper or second bowl or container 11 which is adapted to be supported in an open top of the bowl 10 around a rim 12 of the lower bowl. It will be noted that the lower end of the bowl 11 has a lower wall 13 and a depending flange portion 14 for closing the open end of the lower container 10 and a ring-shaped gasket 15 is supported between a rib 16 on the outer surface of the extension 14 and the rim 12 of the lower container 10, so as to provide a relatively tight seal between the adjacent surfaces of the upper and lower bowls when they are assembled in the manner illustrated in Figure 1. It will be understood that the upper bowl assembly is removable from the lower bowl, and the upper bowl assembly is illustrated in Figure 2.

It will be understood that the water which is contained in the lower bowl 10 and which is normally filled to a suitable level such as that indicated by the dash line 17, may be heated in any suitable manner, and in the construction illustrated in Figure 1, it will be seen that the bowl 10 is supported on an insulating base 18 near the top of which is a heating element sheath 19. It will be understood that an electric current may be conducted through the heating element when a plug 20 is connected to the socket 21 as is illustrated in Figure 10 and a thermostatic switch generally indicated by the numeral 22 is supported within the base 18 so as to automatically deenergize the heating element upon the lower bowl reaching a predetermined temperature. It will be understood that the lower bowl 10 may be supported on the base 18 in any suitable manner, and in the construction illustrated in the drawings, a stud 23 passes through an opening 24 in the lower wall of the container 10, and the stud is relatively tightly attached to a bottom plate 25 of the base 18 by a nut 26 which cooperates with the end of the stud 23.

In order to provide a convenient arrangement for supporting the stud in the bottom wall of the lower bowl 10, the bowl 10 is made of a metallic material such as stainless steel, but it will be understood that the bowl 10 may be made of any other suitable material. Likewise, the upper bowl 11 is made similarly of stainless steel so as to facilitate the connection between the depending flange 14 and the remainder of the bowl 11, such connection being made by welding. To accommodate the head of the stud 23, the bottom of the bowl is dished as shown at 27, and to provide a fluid tight connection, the head may be silver soldered to the bottom as indicated at 28.

In order to provide a fluid connection between the lower and upper bowls so that the heated water may be transferred from the lower to the upper bowl, I provide tube means including a lower tube 30 which depends from the wall 13 of the upper bowl 11 and an upper tube 31 which extends upwardly from the wall 13. It will be seen that both of the tubes are supported from the wall 13 and when the upper bowl is supported in the opening of the lower bowl as is illustrated in Figure 1 the lower tube 30 has a lower end 32 which is adjacent the bottom of the lower bowl 10. The tubes 30 and 31 may be supported in the wall 13 in any suitable manner and in the construction illustrated in the drawings, particularly with reference to Figure 6, I show a connecting member 33 which is supported in an opening in the wall 13, the connector 33 being placed adjacent one side of the wall for reasons which will be brought out more particularly hereinafter. The bottom of the connector 33 has a threaded aperture 34 and an upper end 35 of the lower tube 30 is externally threaded so that the tube 30 may be supported by the threads in the aperture 34. The upper tube 31 has a pair of spaced shoulders 36 and 37 between which is carried a gasket 38 formed from suitable material and having the desired shape so that it will fit relatively tightly in the tapered inner surface 39 of the connector 33. The upper riser tube 31 is therefore supported through the gasket connection and a relatively fluid-tight joint is also provided.

As has already been mentioned, the automatic coffee maker in the construction illustrated in Figures 1 and 5 is designed for use in producing coffee by a drip method, and to this end a basket construction 40 is provided between the upper and lower bowls. The basket 40 may take any suitable shape and in the construction illustrated in the drawings, it is a tubular shaped member having a perforated bottom portion 41 and a removable perforated cover or spreader plate 42. It will be seen that the cover 42 is provided with a handle 43 so as to facilitate the removal of the cover.

In order to provide a convenient arrangement for removing the coffee basket 40, the depending flange 14 of the upper bowl assembly 11 is provided with an inwardly extending shoulder 45 so as to provide a slide or track. As will be seen in Figure 3, this slide or track 45 extends only about half way around the lower periphery of the depending flange 14. The upper portion of the basket 40 is provided with a rolled peripheral edge 46 which has approximately the same size and shape as the depending or inwardly extending track 45. Thus, when the basket 40 is inserted under the depending flange 14 with the rolled edge 46 fitted into the track 45, it may be slid inwardly until the basket 40 is substantially under the tubular shaped depending flange 14 as is illustrated in Figure 3.

As has already been mentioned, the construction as is illustrated in Figure 1 produces coffee according to the drip method, and it will be understood that after the water in the lower bowl has been heated to a suitable temperature, which temperature will be described more particularly hereinafter, it will raise up through the lower and upper riser tubes 30 and 31, respectively, and be discharged through the upper end 47 of the riser tube 31 and fill up the upper bowl 11. It will be understood that upon heating of the water in the lower bowl 10 which is still to a level 17 that the air above the level 17 and below the gasket 15 will also become heated and would tend to expand and cause some of the warm water to pass up through the riser tubes. In order, however, to prevent the water from the lower bowl 10 from transferring to the upper bowl through the lower and upper riser tubes until a predetermined temperature is reached, which predetermined temperature may be of any suitable value such as just below the boiling point of water, I provide an arrangement for allowing heated gas or vapor to bleed off or be removed from the space above the water level in the lower bowl. To this end I provide an opening or bleeder hole 50 in the side wall of the lower riser tube 30, which hole is placed above the normal water level 17. Thus, as the water begins to heat and the air above the water begins to expand, it will bleed off the pressure through the bleeder hole 50 and through the upper riser tube 31 to the upper bowl, and thus prevent the heated water from passing up through the riser tubes until a predetermined pressure is developed inside the lower bowl 10 which corresponds to a predetermined temperature which has been attained by the water inside the bowl 10. Thus, due to this construction the water will be maintained in the lower bowl 10 until the pressure inside the bowl is raised substantially above a value which may be bled off through the relatively small hole 50. After this critical pressure is reached, the heated water 17 which has reached a substantially predetermined temperature will be relatively rapidly forced into the lower opening 32 and up through the riser tubes and be discharged out through the top 47 of the upper riser tube into the upper bowl 11. It will therefore be understood that due to this construction the water will be discharged into the upper bowl 11 at a higher temperature than it normally would be if the bleeder hole 50 was not employed. Thus, a hotter water is present to be brewed into coffee. Furthermore, since a higher pressure will be developed in the lower bowl, the water will be transferred due to this pressure to the upper bowl more quickly. In order to prevent bubbles of steam from contacting or passing out through the top of the upper bowl 11, the upper riser tube 31 is provided with a cap member 51. It will be understood that the open top of the upper bowl 11 may be closed in any suitable manner such as through a cover 52 which fits over the rolled edge 53 of the upper bowl 11. A handle 54 is provided on the cover 52 and in a bore of the handle 54 is a slidable rod 55 which is connected to a spring 56 at its lower end. The spring 56 cooperates with the inner surface of the rolled edge 53 so as to relatively tightly hold the cover 52 in place so that upon grasping the handle member 54, the entire upper bowl construction 11 may be withdrawn from the lower bowl. However, upon depressing the rod 55, the tight connection with the roll 53 may be broken, and the cover 52 removed from the upper bowl 11.

In order to provide a convenient arrangement for preventing any of the water from the bowl 11 which has been transferred thereto from the bowl 10 from passing through the coffee which will be contained in the basket 40 until substantially all the water has been transferred from the lower bowl 10 to the upper bowl 11 and the heat from the heater within the base 18 removed, I provide a valve construction which is indicated by the numeral 60 and which is supported in the lower wall 13. This valve construction 60 as will be illustrated more patricularly in Figure 4 includes a tubular valve housing 61 which is contained in an opening in the wall 13, the housing 61 having an opening 62 which extends through the wall 13. A valve member 63 is supported in the housing 61 for limited movement through a valve cap 64 which is screwed on the outer surface of the housing 61. It will be seen that the valve cap 64 has an opening through which extends a rod portion 65 of the valve for supporting it. The cap member 64 has slots 66 therein so that the pressure inside the lower bowl 10 will be communicated to the lower side of the valve 63. The valve 63 is also provided with a vane 67 and it will be understood that when the pressure of the heated gases which pass through the opening 66 of the valve cap 64 overcomes the weight or any other suitable bias of the valve 63, sufficient force will be acted upon through the vane 67 to cause the valve 63 to close the opening 62.

As has already been described above, when the water in the lower bowl 10 is heated, heated gases will be bled out through the bleeder hole 50, and it will be understood that when the valve 63 is in its open position as is illustrated in Figure 4, the valve opening 62 will also act as a bleeder opening in the same manner as the bleeder hole 50. However, when sufficient pressure is developed in the lower bowl 10 so that the pressure is increased inside the bowl 10, even though it is bled out through the bleeder hole 50, the valve 63 will close and the heated water will relatively rapidly be transferred from the lower bowl to the upper bowl as has already been described. However, since the valve 63 has already been closed, the heated water which falls into the upper bowl 11 will be contained therein since the valve hole 62 has been closed and since the upper riser tube 31 is closed except for the top opening 47, the water will be prevented from passing downwardly through the riser tubes. When all the water which is substantially above the lower end 32 of the lower riser tube 30 has been transferred to the upper bowl 11, the thermostat 22, it will be assumed, will be set so as to open the circuit of the heater and thus cause the lower bowl 10 to cool down. The high pressure which has been built up in the lower bowl 10 will also be released through the bleeder hole 50 and when the pressure in the lower bowl 10 is lowered to a suitable value which is less than the weight of the water in the upper bowl and the weight of the valve stem 63, the valve stem 63 will lower and open the valve hole 62. The water will then pass through the hole 62 and spread out on the spreader plate 42 and be infused with the ground coffee in the basket 40 or any other suitable beverage material which is contained therein, and pass out the perforated bottom wall 41 into the lower bowl 10. It will be understood that the water not only passes through the hole 62 due to the force of gravity but since the bowl 10 has been cooled down and as the pressure will be dissipated out through the bleeder hole 50, a relatively partial vacuum will be created in the lower bowl 10, thus sucking the water from the upper bowl through the open valve and coffee basket to the lower bowl.

*Operation of automatic drip coffee maker*

Although the operation of the automatic drip coffee maker as described above will be generally apparent, its operation will be briefly described as follows:

Let us assume that the upper bowl assembly 11 is removed from the lower bowl 10 so that a sufficient amount of cold water may be poured into the lower bowl 11 to the level indicated by the dash line 17 in Figure 1. The desired amount of coffee may then be placed into the coffee basket 40 and the coffee basket attached to the upper bowl assembly in the manner illustrated in Figure 2. The cover 52 for the upper bowl will be inserted in the opening of the upper bowl so that the operator may grasp the handle 54 and lift the upper bowl assembly and drop it into the opening of the lower bowl 10 until a relatively tight fit is obtained between the gasket 15 and the rim of the lower bowl. The electric current may then be turned on for heating the water in the lower bowl and the remainder of the operation of the automatic drip coffee maker will be entirely automatic.

As the water in the lower bowl 10 begins to heat up, the heated gas and vapor will be bled out through the opening 50 and the valve opening 62. However, when a sufficiently high pressure is reached inside the lower bowl 10 corresponding to a substantially predetermined temperature of the water in the lower bowl, the valve 63 will close and the heated water will relatively rapidly transfer through the lower and upper riser tubes to the upper bowl 11. This will cause a considerable increase in the temperature of the lower bowl 11 sufficient to operate the thermostat 22 and deenergize the heating coil in the base 18. The remaining gas in the lower bowl 10 will immediately begin to cool and the relatively high pressure in the lower bowl 10 will also be bled out at this time through the hole 50, and the upper opening 47 to that portion of the upper bowl above the water level. As the lower bowl 10 cools, the pressure therein will decrease, and it will be understood that the hole 50 is sufficiently small that as the pressure in the lower bowl 10 becomes less than atmospheric, air from the upper bowl will not be transferred to the lower bowl through the bleeder hole 50 sufficiently rapidly to dissipate the partial vacuum being produced in the lower bowl 10 due to the decreasing of its temperature. It will be understood that when a predetermined pressure differential has been obtained, the valve will open causing the water in the upper bowl to pass through the opening 62 and through the coffee in the basket 40 where it will be brewed into the brew and return to the lower bowl 10. After all the water has been sucked out from the upper bowl 11, the upper bowl may be removed by the operator grasping the handle 54 and pulling upwardly. After removing the upper bowl assembly, the operator by pressing the plunger 55 with his thumb, may remove the cover 52 and place it over the opening in the lower bowl 10 which, of course, may have the same size as the opening in the upper bowl.

It will be understood that coffee brewed according to the method described above not only produces a consistently good grade of coffee but the complete operation is accomplished relatively quickly, and I have found that when approximately 7 cups of cold water at 58–60° F. are inserted into the lower bowl 10 and the switch closed that approximately 11–12 minutes are taken before the brew is completed, so that the upper bowl assembly 11 may be removed.

Another advantage of the automatic coffee maker construction described above is that the coffee is brewed in a very simple and improved manner. Thus, during the time the water in the lower bowl is being heated, the ground coffee inside the basket 40 is being preheated so as to diffuse the oil from the coffee beans. Furthermore, due to the pressure operated valve none of the heated water is allowed to infuse the ground coffee until all the heated water has been transferred to the upper bowl at which time the valve will open so as to allow the heated water to seep through the coffee in the basket 40. I have further found that when coffee is brewed according to this method that there is substantially no odor of coffee during the making thereof which indicates that all the volatile oils from the coffee beans being transferred to the brew rather than being transferred to the surrounding air so that it may be smelled.

*Automatic vacuum operation*

In case an operator wishes to employ my automatic coffee maker to make coffee according to another method, that is, according to an automatic vacuum method, the parts described above may be so employed with a minimum change, and I have illustrated in Figure 5, the same parts which have been described above in reference to Figure 1 except for the slight changes. Thus, the lower bowl 10 and the upper bowl 11 are similarly employed except that the upper riser tube 31 of Figure 1 is removed and a different riser tube 70 inserted in the tapered surface 39 of the connector 33. This riser tube 70 is illustrated in Figures 7 and 8 and includes a tubular member 70 with slots 71 on one side and slots 72 on diametrically opposite sides. Thus, as the heated water passes from the lower riser tube 30 to the upper riser tube 70, it passes out through the slots 71 and 72 rather than going to the top of the riser tube as it does in the construction including the riser tube 31 as is illustrated in Figure 1. Furthermore, with this automatic vacuum arrangement, the valve 63 and cap 64 are removed and an imperforate cap 73 placed over the open end of the valve housing 61. This closes the opening in the wall 13 which is normally controlled by the valve in the construction illustrated in Figures 1 and 2. It will be understood that with this construction, the ground coffee is introduced into the upper bowl 11 and a screen 74 is provided inside the riser tube 70 so as to prevent the coffee grounds from returning with the brew after the coffee has been made.

Operation of the automatic coffee maker as is illustrated in Figure 5 is believed to be apparent, but will be seen that upon heating the water in the lower bowl 10 to a sufficient temperature that pressure will be developed in the upper portion of the lower bowl 10, the heated water will be forced from the lower riser tube 30 to the upper riser tube 70 where the water passes out through the slots 71 and 72. It will be understood that with this construction also due to the bleeder hole 50 in the lower riser tube 30 that the water from the lower bowl 10 will be prevented from rising to the upper bowl 11 until it has become sufficiently hot or raised above a predetermined temperature until a pressure is produced in the lower bowl 10 sufficient to overcome the amount of gas or vapor which is bled out through the bleeder hole 50. With this construction also, therefore, a hotter water is transferred to the upper bowl 11 than otherwise would be transferred if no bleeder hole 50 was employed. It will be understood that after substantially all the water is transferred from the lower bowl to the upper bowl 11 that the thermostat 22 will be deenergized thus cooling the lower bowl 10 sufficiently to cause a partial vacuum to be present therein and causing the brew from the upper bowl 11 to be sucked through the screened slots 71 and 72 in the upper riser tube 70, and through the lower riser tube 30 so that the brew passes into the lower bowl 10.

It will be understood that when my dual automatic coffee maker is employed as an automatic vacuum coffee maker as is illustrated in Figure 5, the coffee basket 40 is not employed and therefore it has been removed from the construction as is illustrated in Figure 5. After the coffee has been brewed, the upper bowl assembly 11 may be removed and the cover 52 removed from the upper bowl assembly 11 and placed on the lower bowl 10. The brew is then ready to be used as a beverage.

It will also be understood that various details of construction may be varied through a wide range without departing from the principles of this invention and it is, therefore, not the purpose to limit the patent granted hereon otherwise than as necessitated by the scope of the appended claims.

I claim as my invention:

1. In an automatic coffee maker, a bottom bowl adapted to receive a supply of water, a second bowl above said bottom bowl, means associated with said second bowl for sealing said bottom bowl, tube means for connecting said bowls so that upon heating the water in said bottom bowl to a substantially predetermined temperature heated water will flow through said tube means to said second bowl, pressure bleeder means in said tube means for substantially retaining water in said bottom bowl until the water attains substantially said predetermined temperature in said bottom bowl so that the water upon commencing to flow through said tube means will transfer to said second bowl relatively rapidly, perforated basket means for containing coffee, and pressure operated valve means interposed between said second bowl and said basket means for allowing heated water to flow from said second container through said perforated basket and back to said bottom container only after substantially all water from said bottom bowl has been transferred to said second bowl.

2. In an infusing device, a first bowl adapted to receive a supply of water and having an open top, a second bowl removably supported adjacent the top of said first bowl, said second bowl having an integral bottom wall adapted to close said open top of said first bowl upon said bowls being assembled, said integral bottom having an opening, tube means extending through said opening and having a first portion projecting into said first bowl with an opening adjacent the bottom of said first bowl, and a second portion projecting into said second bowl with an opening communicating with said second bowl, an infusion basket positioned beneath said integral bottom but above the normal cold water level in said first bowl, said integral bottom having a pressure operated valve therein adapted to open upon a decrease in pressure in said first bowl relative to that in said second bowl so that the liquid may be returned to said first bowl through said coffee basket.

3. In an automatic coffee maker, a first bowl adapted to receive a supply of water, a second bowl, means providing a first passage for connecting said bowls so that upon heating the water in said first bowl a sufficient pressure will be developed therein to force the heated water through said first passage into said second bowl, means providing a perforated coffee basket between said bowls, a second passage through which the heated water may pass from said second bowl and through said coffee basket and return to said first bowl, said second passage having a valve therein responsive to the relative pressures of said first and second bowls so as to open said second passage upon a lower pressure being in said first bowl relative to that in said second bowl.

4. In an infusing device, a first bowl adapted to receive a supply of water and having an open top, a second bowl adapted to be removably supported adjacent the top of said first bowl, said second bowl having a bottom wall adapted to substantially close the open top of said first bowl upon said bowls being assembled, tube means extending through said bottom wall for connecting said first and second bowls, a flange depending from said bottom wall of said first bowl and adapted to project into said second bowl when said bowls are assembled, and a removable perforated basket adapted to contain an infusion material supported from said depending flange, said basket having a recessed side portion through which said tube passes without connection to said basket and a rib extending a portion of the way around the lower edge of said depending flange, said basket having an edge adapted to cooperate with said rib to support said basket within said first bowl when said bowls are assembled, said basket being removable with said second bowl from said first bowl and being adapted to be slidable substantially in the plane of said bottom wall to remove said edge from said rib.

5. In an automatic beverage maker, a first bowl adapted to receive a supply of water and having an open top, a second bowl removably supported adjacent the top of said first bowl, said second bowl having a bottom wall adapted to substantially close the open top of said first bowl upon said bowls being assembled, tube means extending through said bottom wall for connecting said first and second bowls, said bottom wall having an opening therein and a tubular valve body surrounding said opening and depending from the lower face of said bottom wall, a perforated valve cap attached to said valve body, and a valve movable within said valve body to close said bottom wall opening in response to the relative pressures prevailing on opposite sides of said bottom wall.

6. In an infusing device a first bowl adapted to receive a supply of water and having an open top, a second bowl removably supported adjacent the top of said first bowl, said second bowl having a bottom wall adapted to substantially close the open top of said first bowl upon said bowls being assembled, tube means extending through said bottom wall for connecting said first and second bowls, said bottom wall having an opening therein and a tubular valve body surrounding said opening and depending from the lower face of said bottom wall, a perforated valve cap attached to said valve body, and a valve movable within said valve body to close said bottom wall opening in response to the relative pressures prevailing on opposite sides of said bottom wall, and means depending from said bottom wall for removably supporting a perforated infusion basket below said valve body.

7. In an infusing device, a lower bowl for receiving a supply of the infusing liquid and having an open top, means for heating said liquid in said lower bowl, an upper bowl having a bottom wall removably seated on said open top and providing a sealing closure therefor, a tube extending from near the bottom of said lower bowl to a point in the upper bowl above the general liquid level normally reached in said upper bowl, a liquid permeable container for infusion material supported beneath said bottom wall, and a valve assembly carried by said bottom wall and including a passage establishing flow communication between said bowls through said permeable container and a pressure responsive valve controlling said passage, said valve being actuated to close said passage when heat-generated gas pressure in said lower bowl exceeds the pressure within said upper bowl tending to open said valve and being actuated to open said valve for the flow of hot water from said upper bowl through said permeable container to said lower bowl when the gas pressure in said lower bowl is less than the pressure within said upper bowl tending to open said valve.

8. In an infusing device, a lower bowl for receiving a supply of the infusing liquid and having an open top, means for heating said liquid in said lower bowl, an upper bowl having a bottom wall removably seated on said open top and providing a closure therefor, a tube extending from near the bottom of said lower bowl to a point in the upper bowl above the general liquid level normally reached in said upper bowl, a liquid permeable container for infusion material removably supported beneath said bottom wall, a U-shaped side indentation in said container for passage of said tube through said container without connection thereto, and a valve assembly carried by said bottom wall and including a passage establishing flow communication between said bowls through said permeable container and a pressure responsive valve controlling said passage, said valve being actuated to close said passage when heat-generated gas pressure in said lower bowl exceeds the pressure within said upper bowl tending to open said valve and being actuated to open said valve for the flow of hot water from said upper bowl through said permeable container to said lower bowl when the gas pressure in said lower bowl is less than the pressure within said upper bowl tending to open said valve.

LELAND H. SNYDER.

REFERENCES CITED

The following references are of record in the file of this patent:

UNITED STATES PATENTS

| Number | Name | Date |
|---|---|---|
| Re. 15,707 | Simonton | Oct. 30, 1923 |
| 41,974 | Class et al. | Mar. 22, 1864 |
| 204,945 | Place | June 18, 1878 |
| 297,190 | Staggs | Apr. 22, 1884 |
| 405,946 | Bulow | June 25, 1889 |
| 627,885 | Viser | June 27, 1899 |
| 1,007,725 | Nelson | Nov. 7, 1911 |
| 1,068,212 | Bodascher | July 22, 1913 |
| 1,602,632 | Zorn | Oct. 12, 1926 |
| 1,836,520 | Xardell | Dec. 15, 1931 |
| 1,866,777 | Sasser | July 12, 1932 |
| 1,895,857 | Mockbee | Jan. 31, 1933 |
| 1,916,369 | Harpster | July 4, 1933 |
| 2,114,063 | Stoner | Apr. 12, 1938 |
| 2,232,614 | Kopf | Feb. 18, 1941 |
| 2,314,018 | Sanderson | Mar. 16, 1943 |
| 2,365,615 | Woodman | Dec. 19, 1944 |

FOREIGN PATENTS

| Number | Country | Date |
|---|---|---|
| 1,719 | Great Britain | 1858 |
| 1,816 | Great Britain | 1865 |
| 10,485 | Great Britain | 1888 |
| 11,583 | Great Britain | 1847 |
| 345,033 | Great Britain | Mar. 19, 1931 |
| 276,959 | Germany | July 23, 1914 |